(12) United States Patent
Goidas et al.

(10) Patent No.: US 7,777,997 B2
(45) Date of Patent: Aug. 17, 2010

(54) ELECTROSTATIC DISCHARGE SAFE UNDER CONVEYOR ANTENNA

(75) Inventors: Peter J. Goidas, Lansdale, PA (US); Raymond R. Hillegass, Slatington, PA (US); Zhong-Min Liu, Doylestown, PA (US)

(73) Assignee: Accu-Sort Systems, Inc., Telford, PA (US)

(*) Notice: Subject to any disclaimer, the term of this patent is extended or adjusted under 35 U.S.C. 154(b) by 419 days.

(21) Appl. No.: 11/726,519

(22) Filed: Mar. 22, 2007

(65) Prior Publication Data

US 2008/0232008 A1   Sep. 25, 2008

(51) Int. Cl.
*H02H 9/00* (2006.01)

(52) U.S. Cl. .......................... 361/56; 361/220
(58) Field of Classification Search ............ 361/56, 361/220
See application file for complete search history.

(56) References Cited

U.S. PATENT DOCUMENTS

| | | | |
|---|---|---|---|
| 3,832,530 A | 8/1974 | Reitboeck et al. | |
| 5,221,831 A | 6/1993 | Geiszler | |
| 5,929,760 A | 7/1999 | Monahan | |
| 5,970,393 A * | 10/1999 | Khorrami et al. | 455/129 |
| 6,218,942 B1 | 4/2001 | Vega et al. | |
| 6,236,316 B1 | 5/2001 | Eberhardt et al. | |
| 6,703,935 B1 | 3/2004 | Chung et al. | |
| 7,010,279 B2 | 3/2006 | Rofougaran | |
| 7,102,523 B2 | 9/2006 | Shanks et al. | |
| 7,136,271 B2 | 11/2006 | Oh et al. | |
| 7,345,635 B2 * | 3/2008 | Hohler | 343/702 |
| 2003/0168319 A1 | 9/2003 | Hart et al. | |
| 2004/0178912 A1 | 9/2004 | Smith et al. | |
| 2005/0247545 A1 | 11/2005 | Ni et al. | |
| 2006/0117554 A1 * | 6/2006 | Herrmann et al. | 29/601 |

OTHER PUBLICATIONS

PCT International Search Report and Written Opinion, dated Jun. 30, 2008.

* cited by examiner

*Primary Examiner*—Jared J Fureman
*Assistant Examiner*—Nicholas Ieva
(74) *Attorney, Agent, or Firm*—Nelson Mullins Riley & Scarborough, LLP

(57) ABSTRACT

An antenna for use in a conveyor system in which items on which radio frequency identification tags are disposed are moved on a conveyor along a path of travel, includes a ground plane, a substrate having a bottom surface received adjacent the ground plane, at least one patch element disposed on a top surface of the substrate, a cover received adjacent the top surface of the substrate, and a front static conductive strip disposed along a front edge of the cover. The antenna is disposed beneath the conveyor and a front edge of the antenna is transverse to the path of travel. The front static conductive strip is electrically connected to the ground plane such that an electrostatic discharge event adjacent the front static conductive strip is discharged to the ground plane.

29 Claims, 13 Drawing Sheets

ELECTROSTATIC DISCHARGE SAFE UNDER CONVEYOR ANTENNA

BACKGROUND OF THE INVENTION

Most item tracking systems in commercial settings can be classified as either a supply chain system or a manufacturing system. Manufacturing systems generally track items that remain within a facility, whereas supply chain systems generally track items that move into, through and out of a facility. One common supply chain system is a distribution center conveyor system on which boxes or other packages from a receiving area are placed and transported to one or more stations at which the packages are identified, sorted and distributed to appropriate locations depending on the sortation. It is well known in such systems to employ bar code labels to the packages to thereby affix relevant information, for example manufacturer and package contents, that can be read by barcode scanners disposed along the conveyor. The scanner outputs information to a controller that associates the information with the package and outputs the associated information to a host system that can then manage the package's progression to its ultimate destination.

Barcode systems, although having developed to a high degree of reliability, suffer from certain inherent limitations in that they require a line of sight between the barcode scanner and the label, and the barcode label must be applied on the package so as to be optically readable. In contrast, radio frequency identification (RFID) tags do not require an optical line of sight for reading by an RFID reader. However, RFID systems are also prone to various limitations, such as potential damage to system components from electrostatic discharges (ESD). A typical RFID system may include an antenna positioned below a conveyor on which boxes or other packages are placed, the antenna sending and receiving signals in order to retrieve information from the RFID tags on the packages. In turn, received signals are sent to a controller that associates the information within the signals with the relevant packages. During operation of such an RFID system, it is not uncommon for electrostatic charges to build up within the components of the system, primarily the conveyor belt, due to friction between the conveyor belt and the components. When discharged in the vicinity of the antenna, as can occur when the seam of the conveyor's belt approaches the antenna, the ESD can cause a high voltage signal to be detected by the antenna and sent to the reader, possibly causing damage to the reader. Signals with charges of 1000V or more are not uncommon for such ESDs.

SUMMARY OF THE INVENTION

The present invention recognizes and addresses considerations of prior art constructions and methods. In accordance with the present invention, an embodiment of a conveyor system for processing items on which radio frequency identification tags are disposed includes a frame and a conveyor that is disposed movably on the frame and that conveys items through a path of travel, each item having at least one respective radio frequency identification tag disposed thereon. An antenna is disposed on the frame, the antenna having a front edge and a rear edge that are transverse to the path of travel so that the antenna radiates radio frequency signals into a first area through which the items pass. The antenna includes a ground plane, a substrate having a bottom surface received adjacent the ground plane, at least one patch element disposed on a top surface of the substrate, a cover received adjacent the top surface of the substrate, and a front static conductive strip disposed along the front edge of the cover. The front static conductive strip is electrically connected to the ground plane such that an electrostatic discharge event adjacent the front static conductive strip is discharged to the ground plane.

Another embodiment of a conveyor system for processing items on which radio frequency identification tags are disposed includes a frame having a generally planar top surface and a generally planar belt that is disposed movably on the frame above the generally planar top surface. The generally planar belt conveys items through a path of travel, each item having at least one respective radio frequency identification tag disposed thereon. At least one antenna is disposed on the frame so that the at least one antenna is generally coplanar with the generally planar top surface beneath the belt, the at least one antenna having a front edge and a rear edge that are transverse to the path of travel and oriented with respect to the belt so that the at least one antenna radiates radio frequency signals into a first area that is proximate the belt and through which the items pass. The at least one antenna includes a substrate, at least one patch element disposed on a top surface of the substrate, a cover received adjacent the top surface of the substrate, and a first static dissipative strip disposed along a top surface of the cover. The static dissipative strip is connected to an electrical ground such that electrostatic charges are dissipated to the electrical ground.

Another embodiment of an antenna for use in a conveyor system in which items on which radio frequency identification tags are disposed are moved on a conveyor along a path of travel includes a ground plane, a substrate having a bottom surface received adjacent the ground plane, at least one patch element disposed on a top surface of the substrate, a cover received adjacent the top surface of the substrate, and a front static conductive strip disposed along a front edge of the cover. The antenna is disposed beneath the conveyor and a front edge of the antenna is transverse to the path of travel. The front static conductive strip is electrically connected to the ground plane such that an electrostatic discharge event adjacent the front static conductive strip is discharged to the ground plate.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
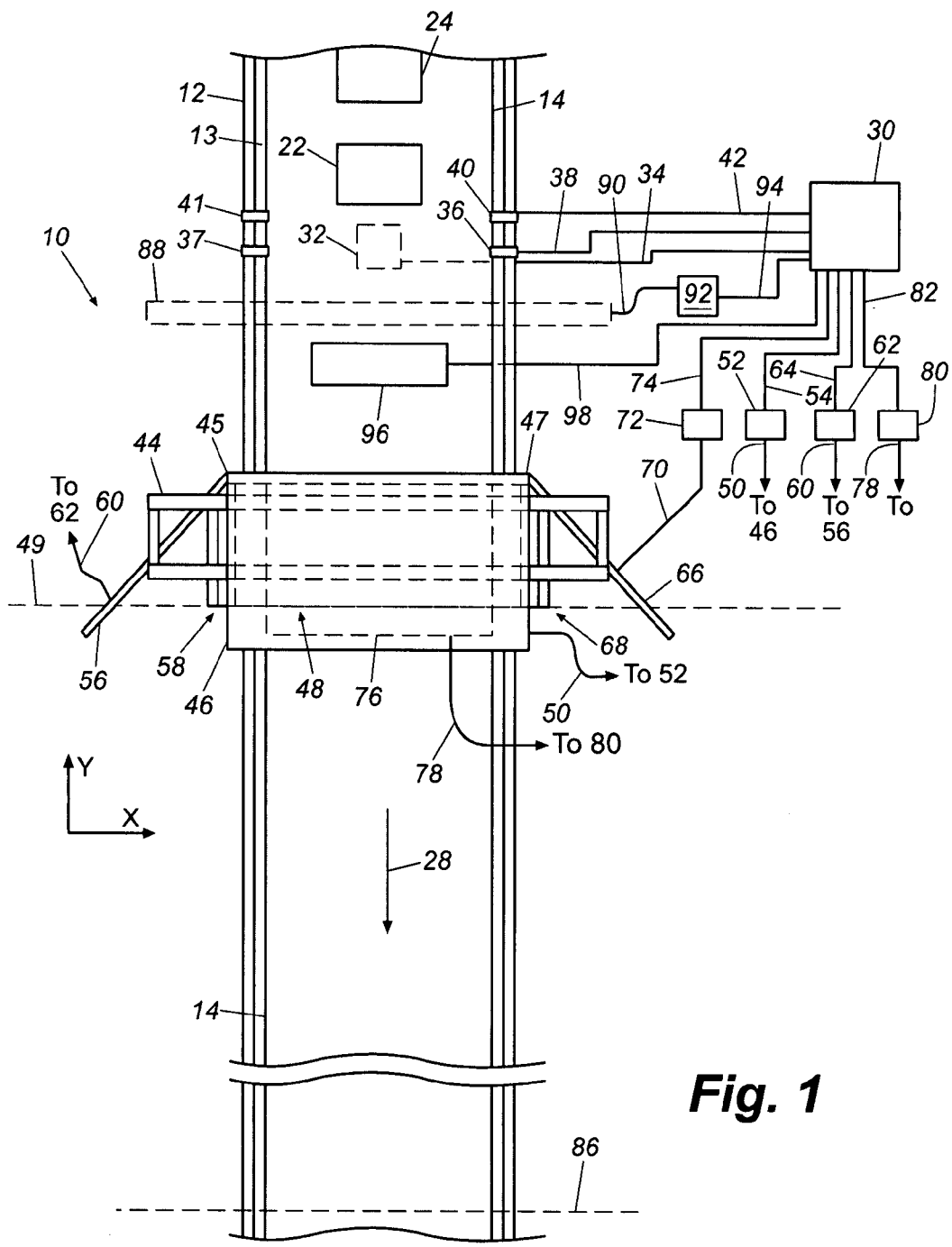
FIG. 1 is a schematic view of a conveyor system in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more example of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure.

Referring to FIG. 1, a conveyor system 10 includes a belt 14 and a frame 12 that defines a generally planar horizontal top surface 13 extending the length of the conveyor and over which belt 14 carries a plurality of successive packages, e.g. boxes 22 and 24, in the belt's running direction (indicated at 28) from an upstream entry point. Top surface 13 may be comprised of a series of rollers extending transverse to running direction 28, a planar metal sheet, or a combination of both. The specific construction of the conveyor frame and belt is not, in and of itself, a part of the present invention, nor is the present invention limited to any particular such construction.

As described in more detail below, an RFID high speed controller ("HSC") 30 interfaces multiple RFID antenna engines and other devices in tracking packages 22 and 24 as they progress down the conveyor. In the presently described embodiment, HSC 30 is a PENTIUM equivalent microprocessor that is part of an industrial computer. HSC 30 runs the WINDOWS XP EMBEDDED operating system and is programmed with several threads developed under the WINDOWS.NET platform and written in the VB.NET language. The organization and operation of these threads is described in U.S. patent application Ser. No. 11/387, 293, filed Mar. 23, 2006, the entire disclosure of which is incorporated by reference herein. It should be understood, however, that the organization and operation of these threads as described therein is provided for purposes of illustration only and that a control program may be written in any suitable language for operation on any suitable operating system.

A tachometer wheel ("TAC") 32 is attached to frame 12 in contact with the underside of conveyor belt 14 so that TAC 32 rotates with movement of belt 14 and outputs (to HSC 30 over a connection line 34) pulses that correspond to the belt's linear movement over top surface 13. Because the pulse signals correlate in a consistent manner to movement of conveyor belt 14 in direction 28, they are used by HSC 30 to selectively track the locations of packages 22 and 24 along conveyor system 10.

A photodetector 36 is disposed on the frame next to the belt so that a line of sight is defined across and just above the belt between photodetector 36 and a retroreflective sensor 37 disposed on the frame opposite the photodetector. Photodetectors and retroreflective sensors should be understood in this art and are available, for example, from Rockwell Automation/Allen-Bradley of Chelmsford, Mass. Because the photodetector line of sight is perpendicular to the path of conveyor belt 14, packages 22 and 24 traveling down conveyor system 10 interrupt the line of sight as they move in direction 28, thereby causing detector 36 to output a first signal to HSC 30 via a connection line 38 at the point the package's leading edge enters the line of sight. Photodetector 36 outputs a second signal to HSC 30 when the package's trailing edge passes out of the line of sight. HSC 30 monitors the number of TAC pulses between reception of the first and second signals and thereby determines the length of the package. Although a photo-eye is described herein with respect to the presently illustrated embodiments, it should be understood that any other suitable presence detector, such as a light curtain or transfer plate system, for detecting an object may be used.

A second photodetector 40 is disposed on conveyor frame 12 at a distance upstream from first photodetector 36 less than the length (in direction 28) of the smallest-length package the conveyor is expected to carry. Second photodetector 40 and an opposing reflector 41 are attached to conveyor frame 12 so that a resulting line of sight is perpendicular to the conveyor belt's path at a predetermined height above conveyor belt 14 so that the photodetector detects the presence or absence of packages of at least the predetermined height. When the leading edge of such a package crosses the line of sight, second photodetector 40 outputs a corresponding signal to HSC 30 via a connection line 42. As described below, the height of the second photodetector 40 line of sight corresponds to the minimum height of packages it is desired to monitor by an overhead antenna. In presently preferred embodiments, the second line of sight is 24 inches and 28 inches, respectively, above the surface of conveyor belt 14, but this variable is configurable by the user, and it should be understood that the user can set the height variable as desired for varying conditions. Furthermore, it should also be understood that second photodetector may be comprised of a single photo-eye disposed at the predetermined height, a light curtain having a variable output, or any other suitable presence detector capable of outputting a signal corresponding to package height. Where a single photo-eye is employed, the detector's binary signal indicates the presence or absence of a package of the predetermined height. When a light curtain is used, however, the output varies with actual package height, and HSC 30 therefore determines whether a package of the predetermined height has occurred through analysis of the light curtain output. Thus, the "line of sight" for a light curtain arrangement is defined by the sensor output in combination with logic at the HSC.

An antenna frame 44 is disposed on conveyor frame 12 at a predetermined distance downstream from first photodetector 36. As described in more detail below, frame 44 defines an RFID antenna tunnel through which packages 22 and 24 travel for detection of RFID tags disposed on the packages. Very generally, the tunnel is defined by a top antenna 46, a pair of side antennas 56 and 66 and a bottom antenna 76, each of which defines a radiation pattern that extends from the respective antenna toward an area above belt 14 through which the packages travel.

A top antenna 46 is attached horizontally to the top of antenna frame 44 so that the antenna is disposed directly above frame 12, spans transversely across the path of belt 14 on the side of the belt on which packages are conveyed and is angled so that antenna 46, and therefore the center of its radiation pattern, faces belt 14 at a 45 degree angle (with respect to a horizontal plane parallel to the conveyor belt) in the downstream direction. In the illustrated embodiment, it is desired to read tags on the packages only when the packages enter a predetermined detection zone, in this instance beginning at a line 49 defined by the downstream edge of a series of radiation absorbent pads associated with the top and side antennas. With respect to top antenna 46, a stack of absorber pads 48 are attached to the top of antenna frame 44 at the upstream edge of top antenna 46 so that absorber pads 48 are disposed just below and close to the antenna. Absorber pads 48, which are generally planar in shape and extend parallel to conveyor belt 14 across the width of antenna 46, significantly shield the pattern and thereby inhibit antenna 46 from detecting upstream RFID tags.

A feed line 50 connects top antenna 46 to an antenna engine 52 that drives transmission signals to the antenna and that receives and processes signals received by the antenna. An output line 54 connects antenna engine 52 to HSC 30.

Side antenna 56 is attached to the left side of frame 44 and laterally offset from the belt so that the antenna is oriented in a vertical plane (perpendicular to the horizontal plane in which belt 14 is disposed) at a 45 degree angle with respect to a vertical plane including the conveyor belt's centerline and so that antenna 56, and therefore the center of its radiation pattern, faces the conveyor belt at a 45 degree angle (with respect to a vertical plane parallel to the belt's center line) in the downstream direction. Antenna 56 is disposed sufficiently high on the left side of antenna frame 44 so that the bottom of antenna 56 is above the plane of conveyor belt 14. Absorber pads 58 are attached to the left side of antenna frame 44 between antenna 56 and belt 14 so that the pads extend from the antenna's upstream edge 45 downstream to line 49. Pads 58 extend parallel to a vertical plane including the belt's centerline to a height at least equal the height of antenna 56. Similarly to pads 48, absorber pads 58 absorb radiation from antenna 56 and thereby block at least a part of the antenna's upstream radiation pattern to thereby inhibit detection of RFID tags upstream of a line extending transversely across the belt at the upstream edges of side antennas 56 and 66.

A feed line 60 connects left side antenna 56 to an antenna engine 62 that drives transmission signals to the antenna and that receives and processes signals received by the antenna. An output line 64 connects antenna engine 62 to HSC 30.

Side antenna 66 is attached to the right side of antenna frame 44 so that the antenna is oriented in a vertical plane (perpendicular to the horizontal plane in which belt 14 is disposed) at a 45 degree angle with respect to a vertical plane including the conveyor belt's centerline and so that antenna 66, and therefore the center of its radiation pattern, faces the conveyor belt at a 45 degree angle (with respect to a vertical plane parallel to the belt's center line) in the downstream direction. Antenna 66 is disposed sufficiently high on the right side of antenna frame 44 so that the bottom of antenna 66 is above the plane of belt 14. Absorber pads 68 are attached to the right side of antenna frame 44 between antenna 66 and belt 14 so that the pads extend from the antenna's upstream edge 47 downstream to line 49. Pads 68 are of identical construction and orientation to pads 58. Similarly to pads 58, pads 68 absorb radiation from antenna 66 and thereby block at least a part of the antenna's upstream radiation pattern to thereby inhibit detection of RFID tags upstream of the transverse line at the side antenna's upstream edges.

A feed line 70 connects right side antenna 66 to an antenna engine 72 that drives transmission signals to the antenna and that receives and processes signals received by the antenna. An output line 74 connects antenna engine 72 to HSC 30.

A fourth antenna 76 is disposed in a horizontal plane below belt 14 so that the antenna's radiation pattern extends upward and above the belt surface. Antenna 76 is located directly between antennas 56 and 66 and directly below antenna 46. A feed line 78 connects bottom antenna 76 to an antenna engine 80 that drives transmission signals to the antenna and that receives and processes signals received by the antenna. An output line 82 connects antenna engine 80 to HSC 30.

Figure 10:
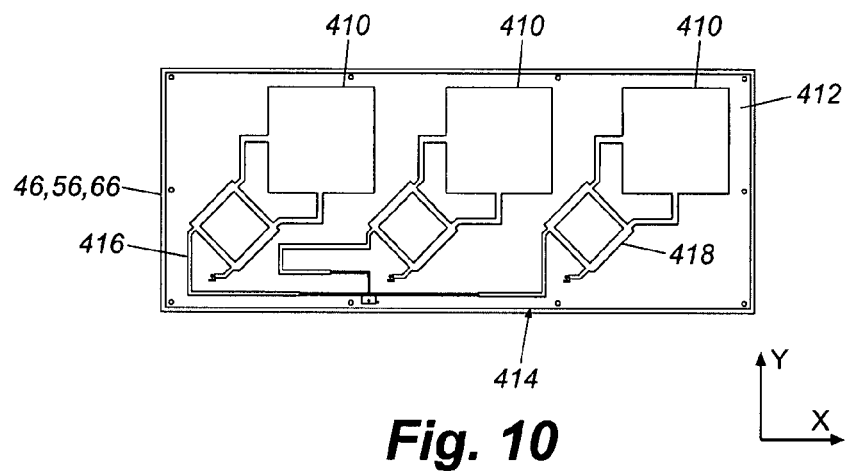
FIG. 10 is a schematic illustration of an RF antenna for use with top and side antennas in a conveyor system as in FIG. 1.

Antennas 46, 56, and 66 are patch antennas that transmit and receive in the range of 902 MHz to 928 MHz. Such patch antennas should be understood in this art, and it should be understood that various types of antenna arrangements could be employed in the present system. Referring to FIG. 10, for example, each patch antenna 46, 56 and 66 is comprised of three patch elements 410 disposed on a dielectric substrate 412 on the opposite side of the substrate from a ground plane. A drive signal to each patch is provided by a feed network 414 comprised of respective feed lines 416 that provide the drive signal to respective square connectors 418. The side of each square patch is approximately 5.15 inches, which is approximately one-half the wavelength of the drive signal. The feed lines to each patch attach to adjacent sides of the patch midway along the sides' lengths. The construction of the patches, and the materials comprising antenna's 46, 56 and 66, are similar to that of the construction of bottom antenna 76, which is discussed in detail below.

As noted above, with reference to FIG. 1, conveyor system 10 includes a bottom antenna 76 that defines a radiation pattern extending above conveyor belt 14. Referring to the embodiment shown in FIGS. 4 and 5, bottom antenna 76 is comprised of a patch array antenna 77 disposed in a bottom pan 308 made of a planar sheet of stainless steel. Bottom pan 308 is bounded by a rim 314 that is raised from the surface of pan 308 so that the rim and pan define a depression that receives patch array antenna 77. A plurality of flanges 318 are stamped and bent upwardly from the body of pan 308, and pins 320 are disposed on the planar surface of pan 308 between the flanges. Flanges 318 and pins 320 are received in corresponding slots 322 and holes 324 in patch array antenna 77 to securely orient antenna 77 in the pan's depression.

Patch array antenna 77 is comprised of a low permittivity polymer foam substrate 330 and a copper ground plane (not shown) bonded to the substrate's underside. An exemplary substrate/ground plane material is FOAMCLAD 100, available from Arlon Microwave Materials Division of Arlon, Inc., of Bear, Del.

In the embodiments illustrated in FIGS. 4 through 7, patch array antenna 77 includes a single row of three patch elements 332 on the side of substrate 330 opposite the ground plane. Each patch is stamped from approximately 0.0014 inch thick copper or other high-conductivity metal to form a 5.15 inch sided square and is disposed in the substrate so that the top of the patch is flush with the top surface of the substrate. However, the antenna may have more or fewer than three patch elements, for example depending on the frequency band at which the antenna will operate and the physical space of the conveyor belt. Systems in accordance with the present invention may employ antennas having two or four, or other suitable number of, patch elements. In the embodiment illustrated in FIGS. 6 and 7, a coaxial connector 334/336 connects the patch array antenna 77 to an RF cable from the respective RF engine. In the embodiment shown in FIGS. 4 and 5, coaxial connector 334/336 is connected to the antenna assembly by pins 340.

Figure 4:
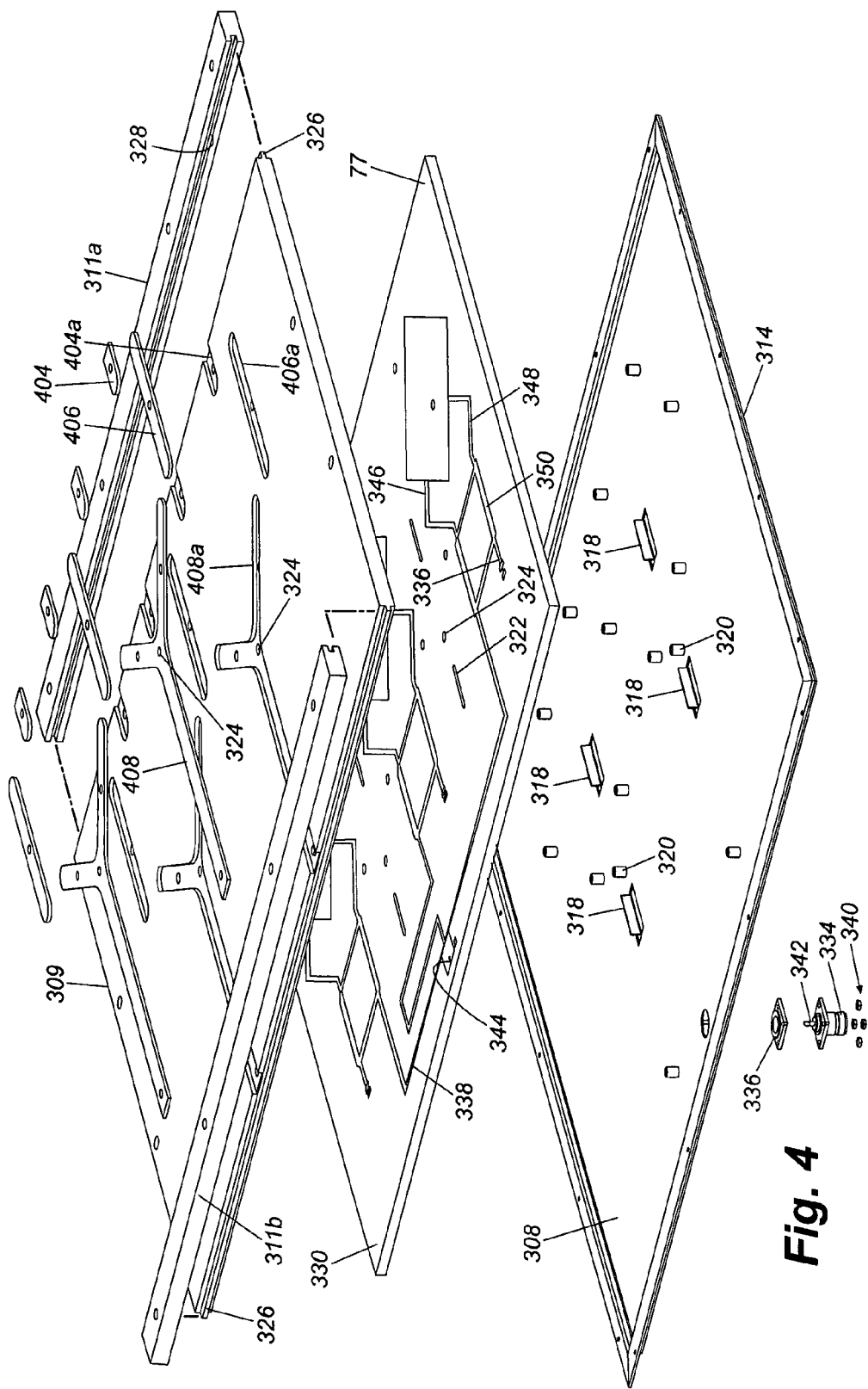
FIG. 4 is an exploded view of an RF antenna in accordance with an embodiment of the present invention.
Figure 5:
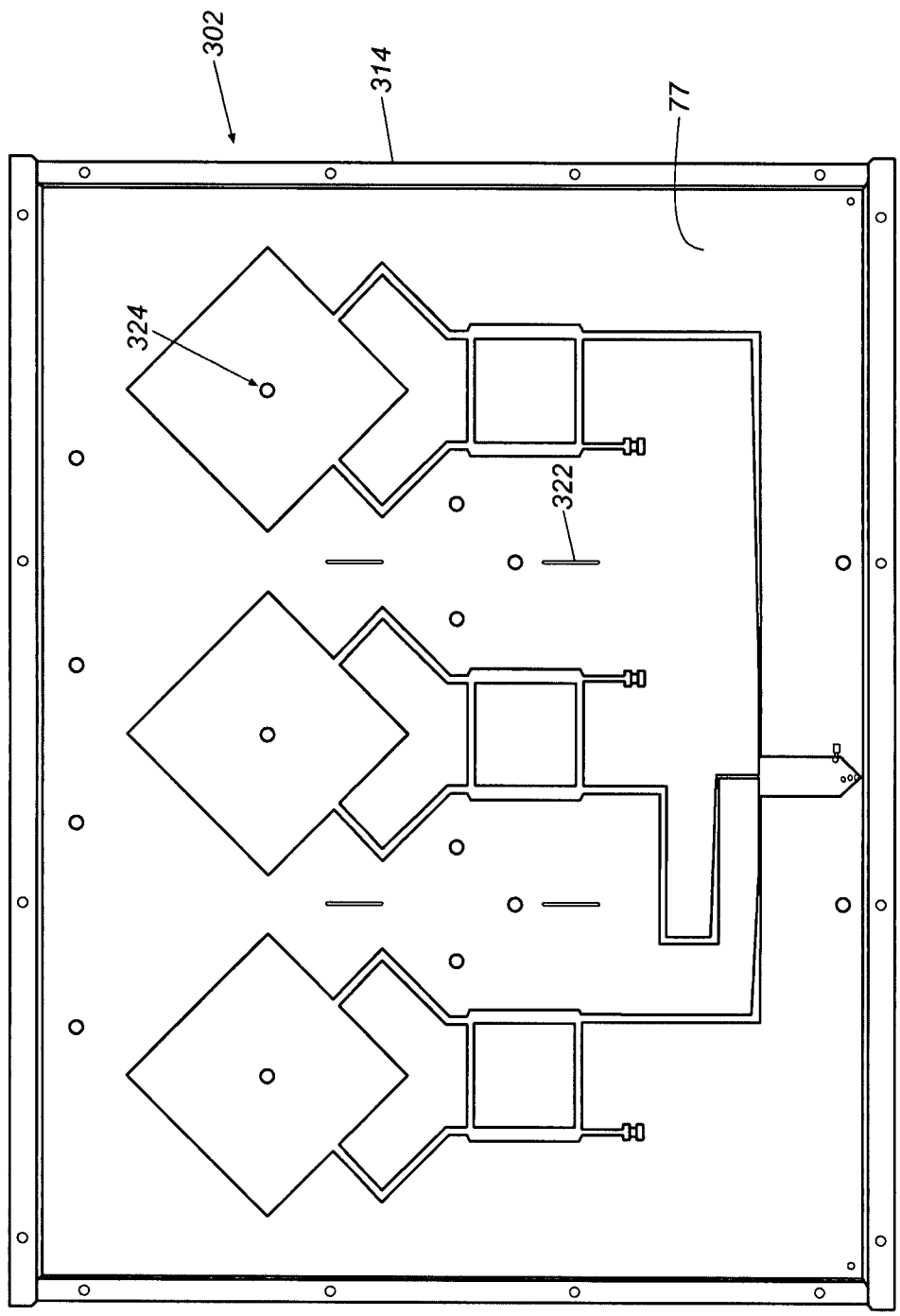
FIG. 5 is a top perspective view of an RF antenna for use with the conveyor system as in FIG. 1.

As best seen in FIG. 4, a 0.5 inch thick ultra-high molecular weight (UHMW) polyethylene cover 309 is disposed over the top of patch array antenna 77 and is received between front and rear static conductive strips 311a and 311b, respectively. Flanges 326 extend outwardly from cover 309 are received in respective longitudinal grooves 328 formed in front and rear static conductive strips 311a and 311b. UHMW polyethylene cover 309 secures patch array antenna 77 within frame 302 and is secured to rim 314 by a plurality of fasteners that are passed through apertures formed in both the static conductive strips and the side edges of the cover, and the corresponding apertures formed in rim 314. The top surfaces of cover 309 and front and rear static conductive strips 311a and 311b are coplanar in order to minimize the potential for friction between bottom antenna 76 and belt 14. Front and rear static conductive strips 311a and 311b are electrically connected to ground by the fasteners used to connect them to rim 14. The electrical ground can be either bottom pan 308 or the copper ground plane of patch array antenna 77. As such, front and rear static conductive strips 311a and 311b discharge ESD events occurring in their vicinity to ground.

Preferably, static conductive UHMW polyethylene material is used for constructing front and rear static conductive strips 311a and 311b. Static conductive materials generally have resistivity values between $10^3$ and $10^6$ ohms per square. However, as discussed in greater detail below, materials having resistivity values either above or below the noted range can also be suitable for constructing the front and rear static conductive strips. Static conductive UHMW materials suitable for use in the presently disclosed invention are available from McMaster-Carr Supply Company of Atlanta, Ga. (e.g., Part No. 8826K).

The top surface of UHMW polyethylene cover 309 includes a plurality of grooves formed therein for receiving correspondingly dimensioned static dissipative strips. As such, the top surface of each static conductive strip is substantially coplanar with the top surface of cover 309. In other embodiments, the static dissipative strips protrude slightly upward from the top surface of cover 309 to help insure contact with the belt of the conveyor and the belt's seam. In the preferred embodiment shown, a set of first static dissipative strips 404 is received in a first set of grooves 404a, a set of second static dissipative strips 406 is received in a second set of grooves 406a, and a set of third static dissipative strips 408 is received in a third set of grooves 408a. Each static dissipative strip is connected to an electrical ground, as discussed below.

Preferably, static dissipative UHMW polyethylene material is used for constructing static dissipative strips 404, 406 and 408. Static dissipative materials generally have resistivity values between $10^6$ and $10^9$ ohms per square. However, as discussed in greater detail below, materials having resistivity values either above or below the noted range can also be suitable for use in constructing the static dissipative strips. Static dissipative UHMW materials suitable for use in constructing the static dissipative strips of the present invention are available from McMaster-Carr Supply Company of Atlanta, Ga. (e.g., Part No. 85705K).

As shown, each first groove 404a extends rearwardly from the front edge of cover 309 and has a depth that is substantially the same as the thickness of a corresponding first static dissipative strip 404 received therein. Each first groove 404a is approximately 0.25 inches deep and 0.38 inches wide. Each first static dissipative strip 404 is secured within its respective first groove 404a on cover 309 by a fastener that passes through aligned apertures 324 formed in first static dissipative strip 404, cover 309 and patch array antenna 77, and that engages a corresponding pin 320 disposed on pan 308. The fastener (not shown) electrically grounds first static dissipative strip 404 to a ground plane. The ground plane can be either bottom pan 308 or the copper ground plane of patch array antenna 77.

Figure 13A:
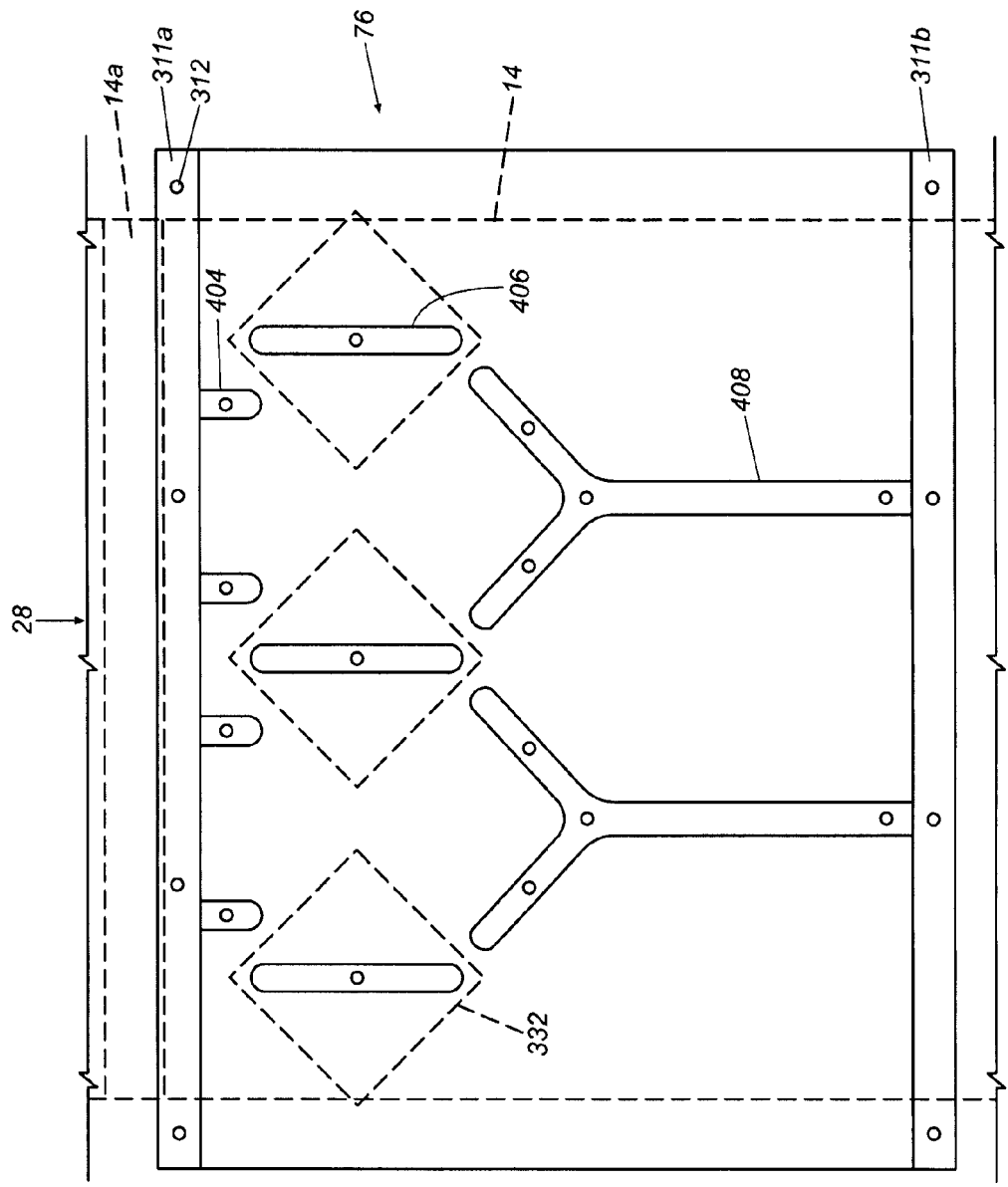
FIGS. 13A through 13C are top perspective views of the RF antenna as in FIG. 4 including a belt of the conveyor.
Figure 13B:
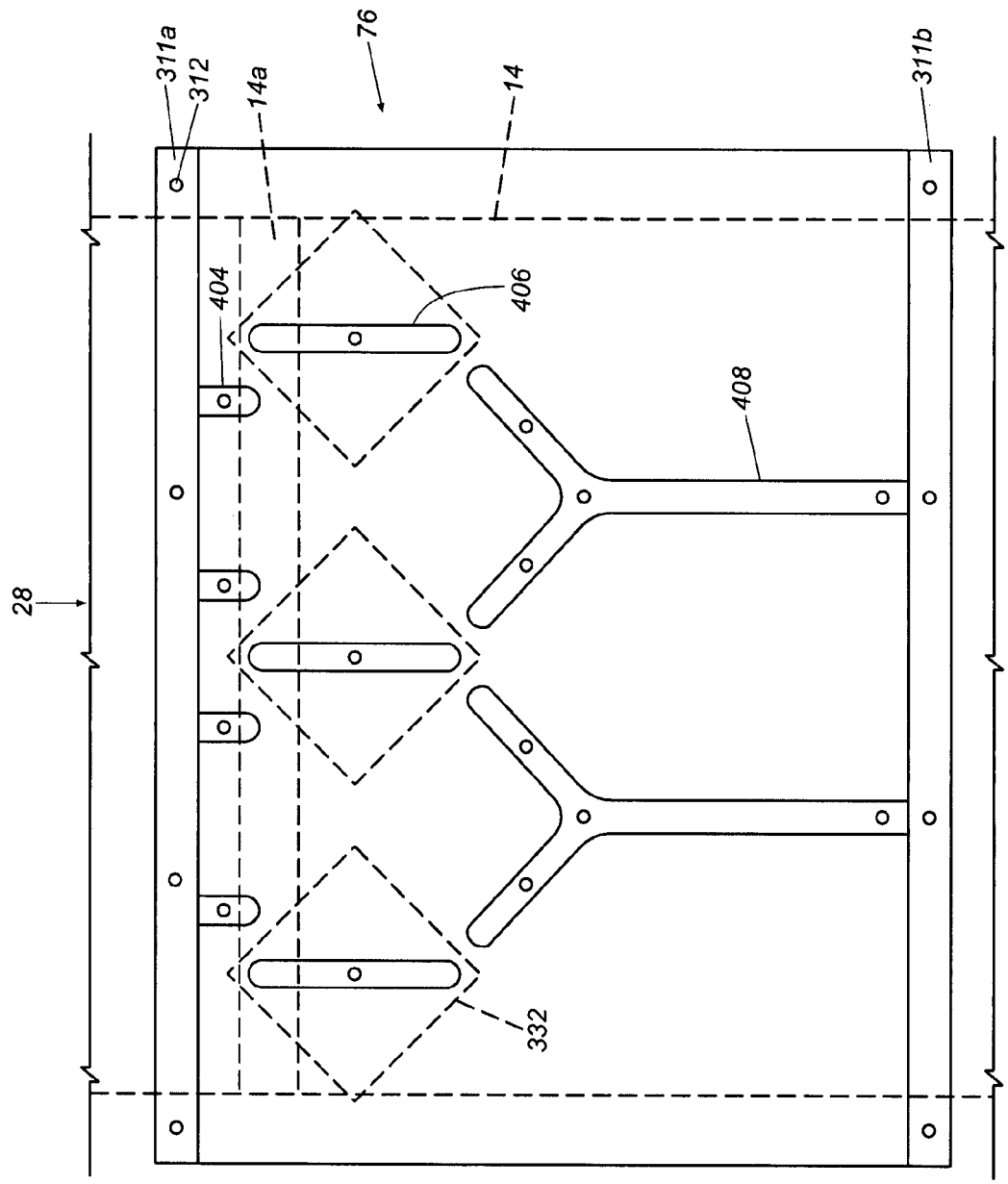
Figure 13C:
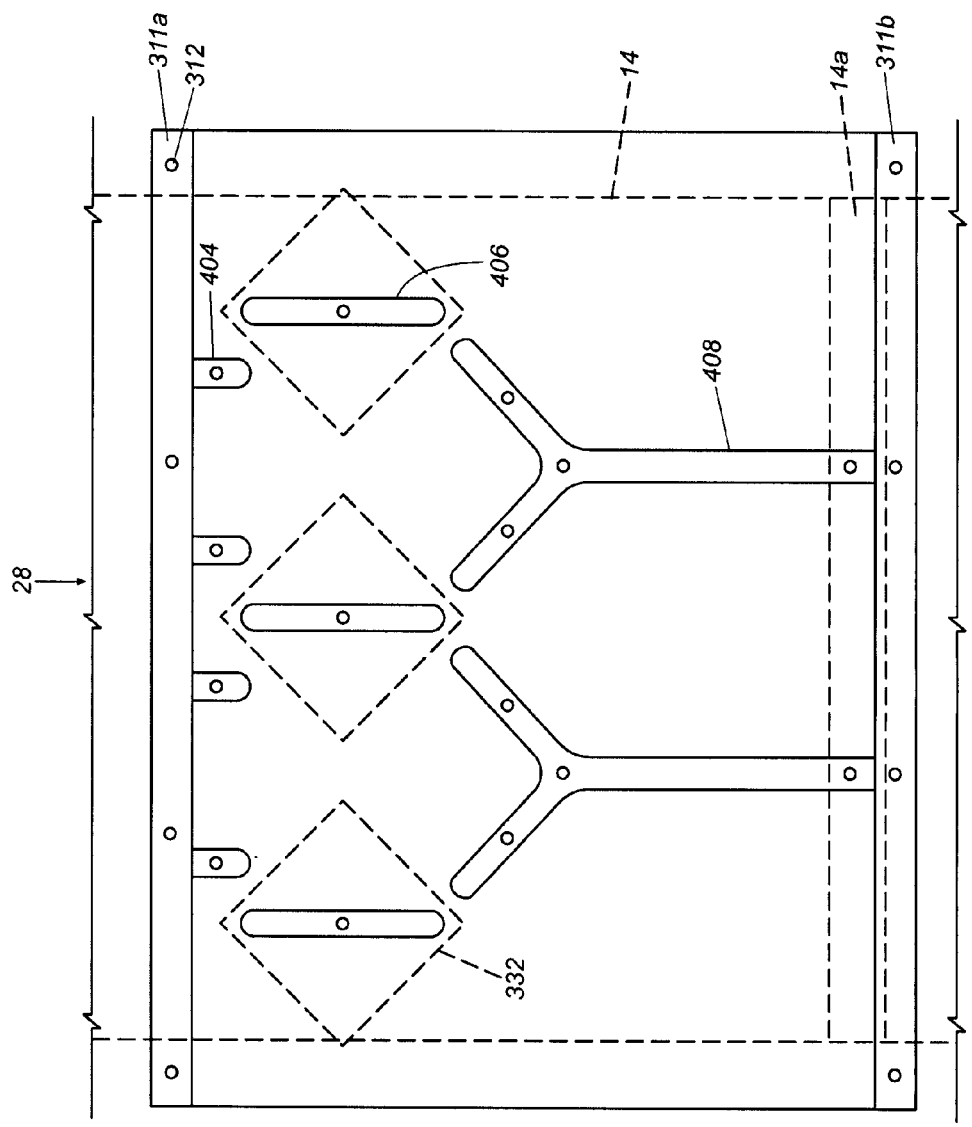

Each second static dissipative strip 406 is received in a corresponding second groove 406a formed above a corresponding patch element 332 of patch array antenna 77. Each groove 406a of the second set is approximately 0.25 inches deep and 0.75 inches wide. Each second groove 406a is formed such that it is bounded by the outer periphery of the respective patch element 332 (as best seen in FIG. 13A through 13C) and extends along the longitudinal axis of the patch element. In this configuration, each second static dissipative strip 406 has been shown to not adversely affect the performance of its respective patch element 332. Each second static dissipative strip 406 is secured in its respective second groove 406a by a fastener passing through aligned apertures 324 formed in second static dissipative strip 406, cover 309 and patch array antenna 77. Passing the fastener through aperture 324 formed at the center of each patch element 332 has also been found not to adversely affect the performance of the patch elements. More specifically, the preferred configuration has been found not to de-tune (e.g., adversely shift the frequency range at which the antenna operates) the patch array antenna 77. Each second static dissipative strip 406 is electrically connected to a ground plane by its respective fastener.

Each third static dissipative strip 408 is substantially Y-shaped and is received in a corresponding third groove 408a formed in cover 309. The two smaller portions of each third groove 408a of the third set is approximately 0.25 inches deep and 0.38 inches wide while the rear portion of each bottom grove 408a is approximately 0.25 inches deep and 0.75 inches wide. The rear end of each third static dissipative strip 408 is adjacent rear static conductive strip 311b. Each third static dissipative strip 408 is also secured in its respective third groove 408a by fasteners passing through aligned apertures 324 in third static dissipative strip 408, cover 309 and patch array antenna 77. The fasteners electrically connect each third static dissipative strip 408 to the ground plane.

The noted dimensions of each static dissipative strip can be varied. Of primary concern when selecting the dimensions of the strips are the ability to dissipate charge, structural integrity of the strips, and effects of the dissipative material or antenna performance, as discussed below.

As best seen on FIGS. 13A through 13C, first 404, second 406 and third 408 sets of static dissipative strips are arranged on cover 309 such that a line drawn transverse to the path of travel (represented by arrow 28) of belt 14 of the conveyor intersects at least one of the three sets of static dissipative strips at any given time as that line passes from the front to the back of bottom patch antenna 76. As such, a structure such as a seam 14a on belt 14 is continuously connected to ground by at least one set of the static dissipative strips as seam 14a repeatedly passes over bottom patch antenna 76.

As shown in FIG. 13A, seam 14a first comes into contact with front static conductive strip 311a such that ESD events potentially caused by the approach of seam 14a to the leading edge of bottom patch antenna 76 are conducted to the ground plane. As seam 14a moves rearwardly, it encounters the first set, the second set and then the third set of static dissipative strips. As shown in FIG. 13B, when transitioning from one set of static dissipative strips to the next, seam 14a is in contact with both sets. As such, rather than building up on bottom patch antenna 76, potential electrostatic charges are discharged to the ground plane. Seam 14a eventually passes over rear static conductive strip 311b such that any remaining electrostatic charges present are fully discharged to the ground plane.

One skilled in the art should understand that although static conductive materials generally have resistivity values that fall within the range of $10^3$ to $10^6$ ohms per square, materials with resistivity values outside of this range may be suitable for constructing the front and rear static conductive strips provided those materials perform in a suitable manner. More specifically, the materials remove enough of the electrostatic charge from the conveyor belt in the vicinity of its seam such that potential damage to the antenna's reader is avoided. As well, although the resistivity values of static dissipative materials generally fall within the range of $10^6$ to $10^9$ ohms per square, materials having resistivity values that fall outside of this range may be used to construct the static dissipative strips provided they are sufficiently conductive to prevent electrostatic charges from developing in the vicinity of the conveyor belt's seam as it passes over the antenna. Additionally, the materials selected for use in the static conductive and static dissipative strips should not adversely affect the proper operation of the antenna, as discussed below.

When selecting materials for use in the static conductive and static dissipative strips, the desired read rate of the RFID tags, the antenna read zone, and the power level and frequency at which the antenna will operate are considered. As one skilled in the art should understand, antenna radiation patters are not entirely predictable, which leads to variations in the probability that an RFID tag will be detected and queried as it is moved to various positions within the antenna read zone. Generally, before selecting a specific antenna for use in an RFID system, the antenna is tested by determining the probability that an RFID tag will be detected at a selected number of locations within the antenna read zone for a given operating power and frequency of the antenna. The initial power level for operating the antenna is largely based on the desired read rate for the RFID system. As well, the maximum power level at which the antenna is to be operated is limited by the desire not to detect RFID tags that are outside of the selected antenna read zone.

Once the antenna, the antenna read zone and the read rate of the RFID system are selected, the potential effects of the static conductive and static dissipative strips on the operation of the antenna are determined. As discussed above, fasteners that engage posts located on the pan of the antenna are used to serve the static conductive and static dissipative strips to the cover of the antenna. Antenna modeling is used to determine the locations for the posts that will least affect the operation of the antenna. Antenna modeling may be conducted with software programs such as IE3D, available from Zeland Software, Inc. of Freemont, Calif., and HFSS from Ansoft Corporation of Pittsburgh, Pa. Next, possible locations for the static conductive and static dissipative strips are considered. Preferably, at least one static conductive strip is positioned relative to the antenna such that a suitable amount of any electrostatic charge in the vicinity of the conveyor belt's seam is discharged to ground by the static conductive strip before the seam reaches the patch elements of the antenna. As discussed in greater detail below, when determining potential locations for the static dissipative strips, it is desired that the ends of adjacent sets of strips "overlap" such that the belt's seam is constantly in contact with at least one set of static dissipative strips as the seam moves from the front to the rear of the antenna.

Antenna modeling can also be used to determine the potential affects of each possible configuration of static conductive and static dissipative strips on the antenna. In addition to this initial assessment, it is preferred that each configuration is actually tested for each material selected. The effects of the given configuration of static conductive and static dissipative strips for the selected materials are determined by operating the antenna with the configuration and determining the probability that an RFID tag will be detected at a selected number of positions throughout the antenna read zone. To offset any potential effects of the static conductive and static dissipative strips on the antenna, the operating power level of the antenna may be increased, being mindful of not reading tags outside of the antenna read zone and remaining within any other desired system limitations. The effects of the static conductive and static dissipative strips on the operation of the antenna can also be adjusted by selecting materials of differing resistivity values or by altering the configuration of the strips relative to the antenna.

Figure 6:
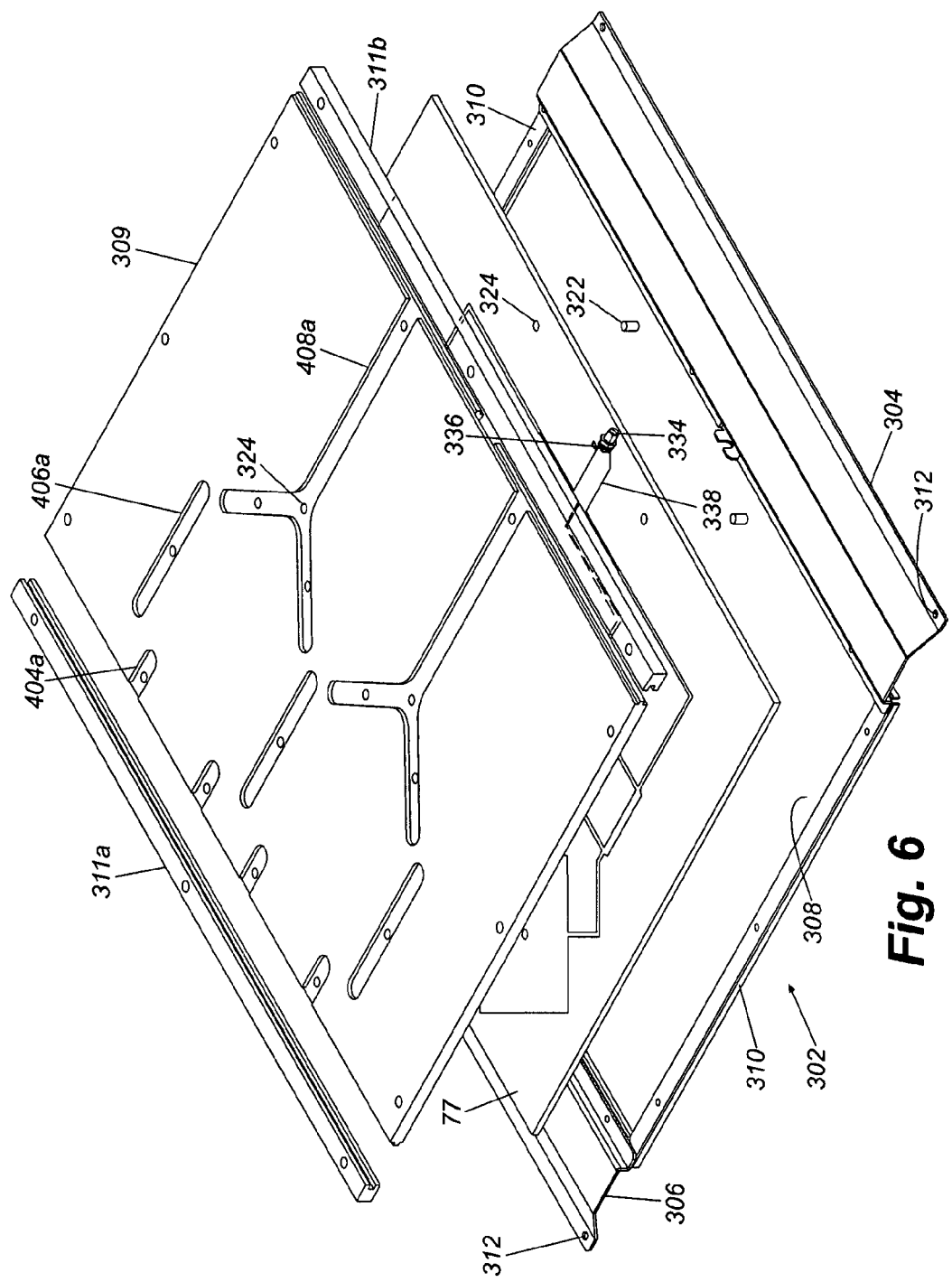
FIG. 6 is an exploded view of an RF antenna in accordance with an embodiment of the present invention.
Figure 7:
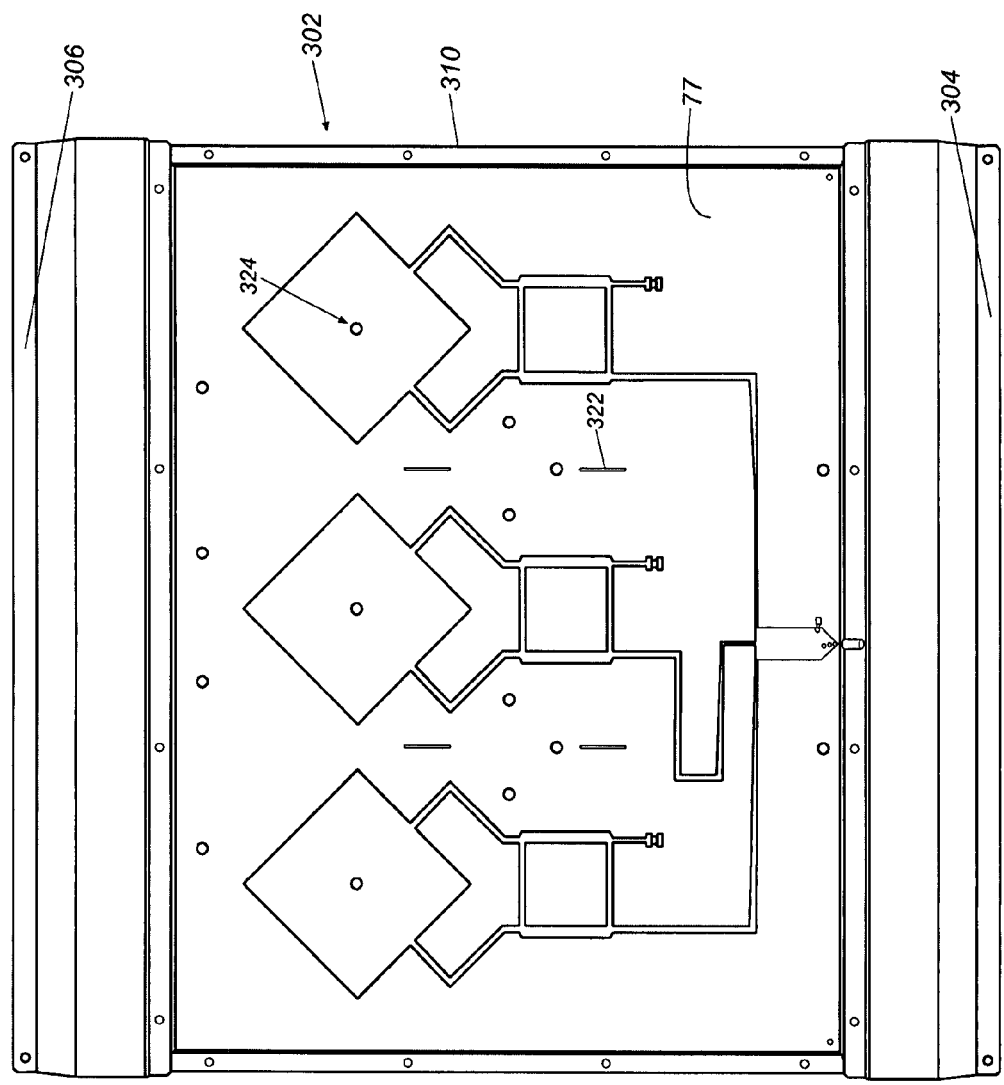
FIG. 7 is a top perspective view of an RF antenna in accordance with an embodiment of the present invention.

Referring to FIGS. 6 and 7, an alternate embodiment of a bottom antenna 76 is comprised of a patch array antenna 77 disposed in a frame 302 having forward and rear ramps 306 and 304. Frame 302 is secured to the conveyor system frame immediately under the conveyor belt by screws (not shown) received through holes 312 in front and rear ramps 306 and 304 and that screw into the conveyor frame's planar top surface 13. The antenna frame therefore creates a slight rise as the belt moves over forward ramp 306, across patch array antenna 77 and down rear ramp 304. Due to the antenna frame's low profile, however, the rise is slight, and in a preferred embodiment the vertical height of the frame and antenna combination, measured from the connection between ramps 304/306 and the top surface of the antenna, is about 0.8 inches. It should be understood, however, that the antenna frame may be dimensioned as desired, provided the frame/antenna assembly's height does not impair progress of the packages on the conveyor system.

Side rails 310 are received in grooves defined at the corner of front and rear ramps 304 and 306. A 0.5 inch UHMW polyethylene cover 309 secures the patch antenna array within the ramps and the rails and is secured to the ramps and the rails by a plurality of screws.

In each of the above-mentioned embodiments, the antenna frame depression's depth, and the thickness of patch array antenna 77, is approximately 0.75 inches, so that the top surface of the antenna is approximately flush with the top of rim 314 (FIGS. 4 and 5) or rails 310 (FIGS. 6 and 7).

While the above-described embodiments of antenna frame 302 may be presented with an antenna having a given patch element arrangement, it should be understood that this is for purposes of example only and that the antenna arrangements disclosed herein can be housed in any of the various frames. As well, other configurations and arrangements of both static conductive strips and static dissipative strips are possible. For example, an alternate embodiment includes front and rear static conductive strips that are received in grooves on the surface of cover 309 in a manner similar to that described for the static dissipative strips above. As well, alternate embodiments include static dissipative strips shaped differently than those shown.

Figure 8:
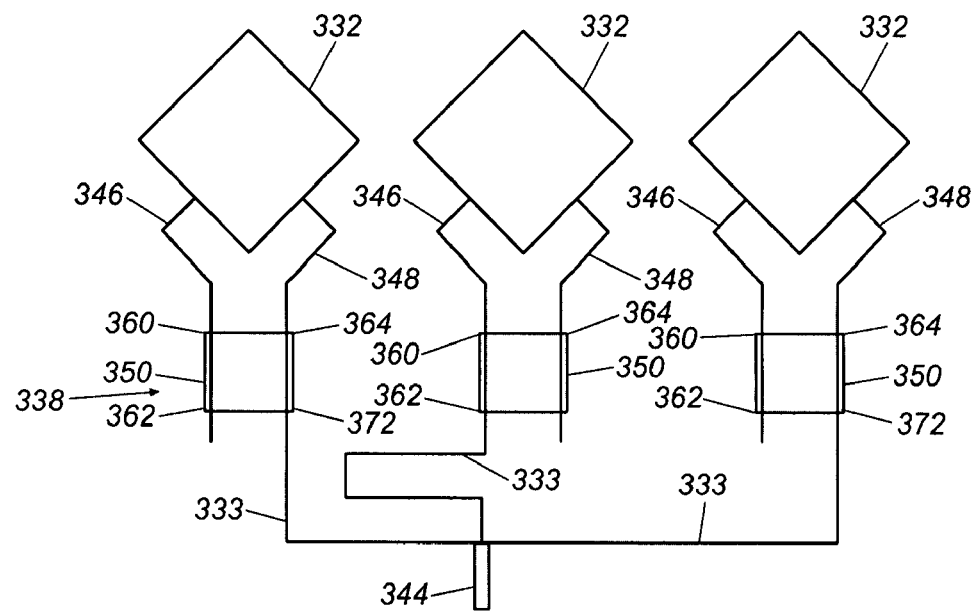
FIG. 8 is a schematic illustration of the RF antenna as in FIG. 5.
Figure 9:
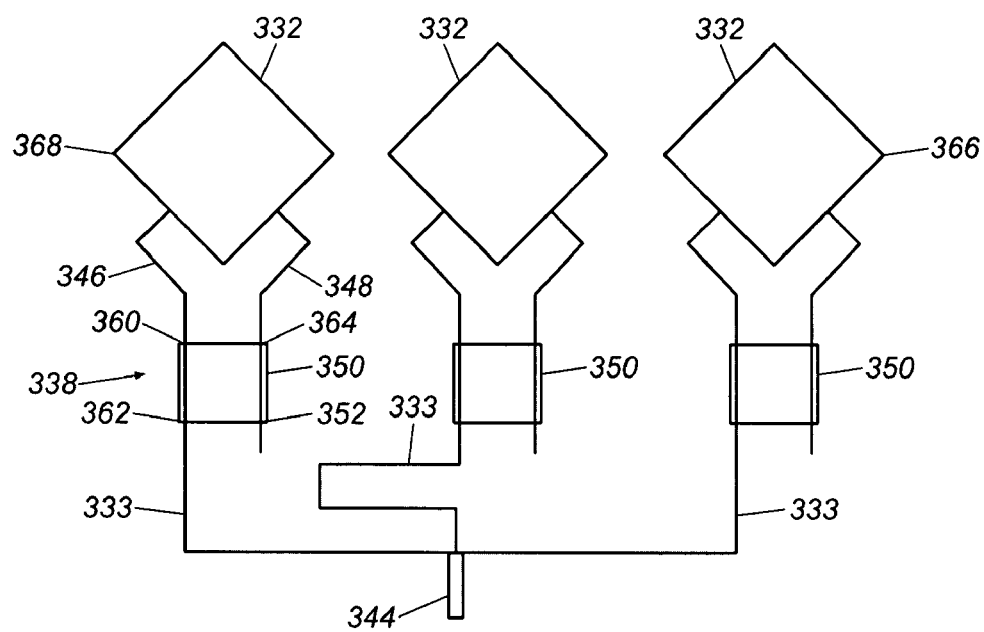
FIG. 9 is a schematic illustration of the RF antenna as in FIG. 7.

Referring now to FIGS. 8 and 9, in all the illustrated embodiments, feed network 338 is a corporate network that combines the power received from each patch element and delivers the combined signal to center conductor 342 along separate paths from respective patch elements 332. Each path includes two feed lines 346 and 348 attached mid-way along adjacent sides of the patch element. Feed lines 346 and 348 are attached at their opposite ends to adjacent top corners of a square connector 350 comprised of sides of a length approximately one-quarter the wavelength of the signal carried by the feed network. A trace 352 extends from a first bottom corner of square connector 350 and is connected to ground through a resistor. The opposite bottom corner of the square connector is connected to the feed trace.

The feed line extending from square connector 350 has an impedance of 130 ohms, whereas the initial feed line extending from an entry point 344 has an impedance of 150 ohms. Accordingly, a one-quarter wave element may be disposed within the feed trace to match the impedances. The patch elements' impedance varies with frequency, and the elements define an impedance giving an acceptable impedance match only over a relatively small percentage of the radiation bandwidth. Of course, the range of what is considered an acceptable impedance match may depend on the performance required of an antenna in a given system. As should be well understand in this art, several things affect a patch array's achievable bandwidth. Chief among these are dielectric thickness and dielectric losses between the patch elements and ground. Accordingly, these characteristics may be varied as desired to achieve a desired impedance match and operative frequency range. In the presently described embodiments, patch array antenna 77 operates within a frequency range of 902 to 928 MHz, as dictated by the Federal Communications Commission. The feed network and patch elements are constructed and arranged so that there is less than −15 dB return loss.

Assuming the center of the 902 MHz to 928 MHz operative bandwidth, or 915 MHz, the antenna's center wavelength (in air) is approximately 13 inches. As should be understood in this art, however, the permittivity of the substrate and cover material reduces the wavelength of the drive signal in the antenna from the in-air wavelength, the two wavelengths being related by a factor of the in-air wavelength divided by the square root of 2.3, and in the illustrated embodiment, the antenna wavelength is approximately 10.3 inches. As noted above, the length of each side of each square patch element 332 is one-half the antenna wavelength, and the length of each side of each square connector 350 is one-quarter the antenna wavelength. Accordingly, the side of each patch element 332 is approximately 5.15 inches, and the length of each side of square connector 350 is approximately 2.58 inches.

The patch elements are aligned in a row extending transverse (the X direction) to the path of the conveyor belt so that the center patch 332 is disposed in the center of the belt's path. The side patches are aligned with the center patch in the transverse direction, and the distance from patch corner 366 to patch corner 368 is approximately 26 inches, or approximately the width of the conveyor belt. The center-to-center spacing between adjacent patches is approximately nine inches.

Figure 11A:
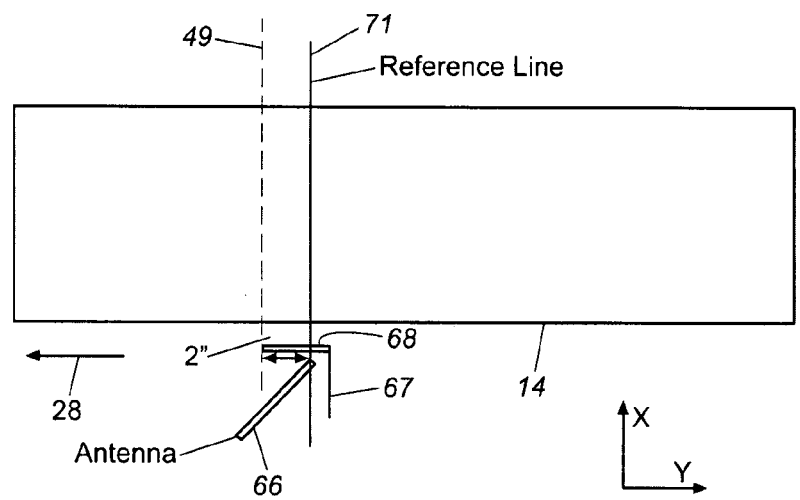
FIG. 11A is a schematic illustration of a side antenna in a conveyor system as in FIG. 1.
Figure 11B:
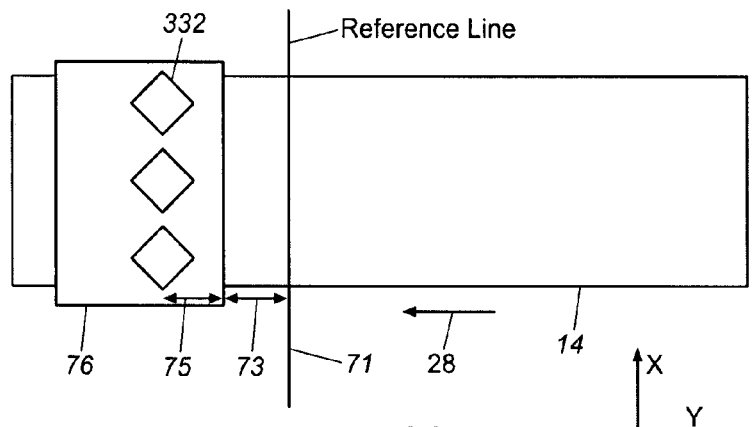
FIG. 11B is a schematic illustration of a bottom antenna in a conveyor system as in FIG. 1.
Figure 11C:
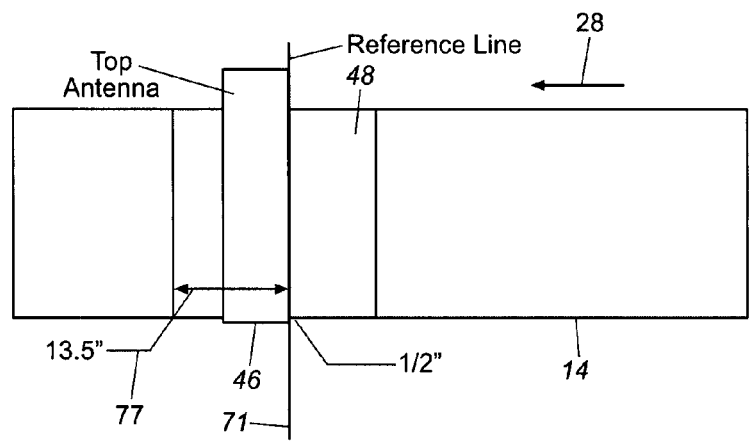
FIGS. 11C and 11D are schematic illustrations of a top antenna in a conveyor system as in FIG. 1.
Figure 12:
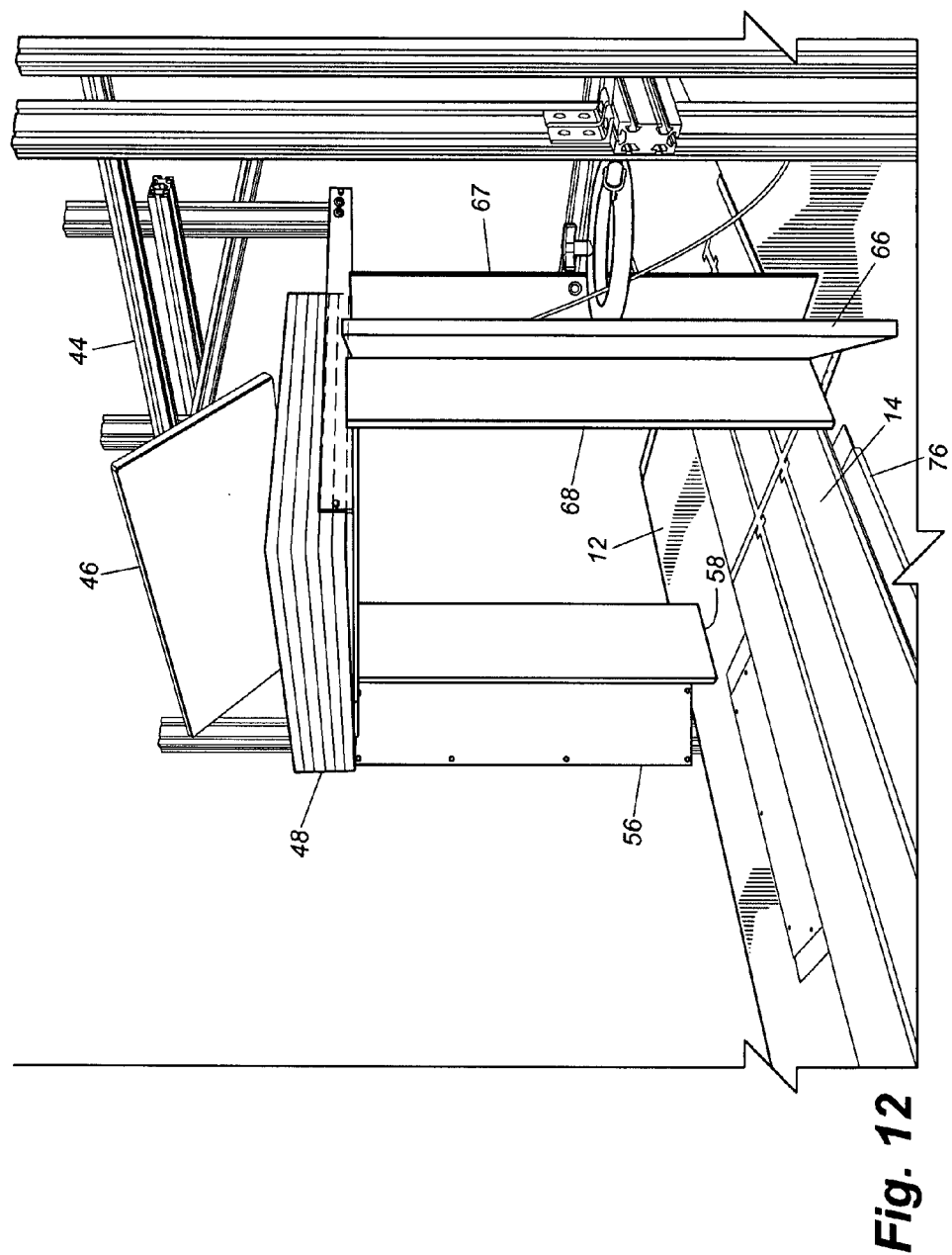
FIG. 12 is a perspective view of an antenna tunnel for use in a conveyor system as in FIG. 1.

FIGS. 11A through 11C schematically illustrate the disposition of the top, side and bottom antennas with respect to the absorber pads and the conveyor belt. FIG. 12 is a perspective view of an exemplary antenna tunnel.

Referring to FIG. 11A, side antenna 66 is disposed beside conveyor belt 14 approximately 2 inches above the conveyor frame. A metal plate 67 extends vertically upward from the conveyor and has an L-shaped cross-section in the X-Y plane. The length of each leg of metal plate 67 is approximately 7.5 inches. The length (in the Y direction) of ferrite absorber pads 68 is approximately 7.75 inches, such that the absorber pads extend slightly downstream of the downstream edge of metal plate 67.

Side antenna 56 (not shown in FIG. 11A) is the mirror image of antenna construction 66, as shown in FIG. 12. A reference line 71 can be considered to extend transversely across conveyor belt 14 at the back edges of antennas 66 and 56. Upstream from this line (with respect to the belt's running direction 28), there should be no detection of RFID tags by the antenna tunnel. Moreover, absorber pads 58 and 68 significantly reduce the antenna radiation pattern between reference lines 71 and line 49. Thus, while it is possible that an RFID tag may be read between lines 71 and 49, the absorber pads reduce this likelihood.

Referring to FIG. 11B, bottom patch antenna 76 is disposed at a distance 73 (approximately 8 inches) downstream from reference line 71. The transverse center line of patch elements 332 is a distance 75 (approximately 7 inches) downstream of the leading edge of antenna 76, resulting in an approximately 15 inch downstream distance between reference line 71 and the line of patch elements 332.

Figure 11D:
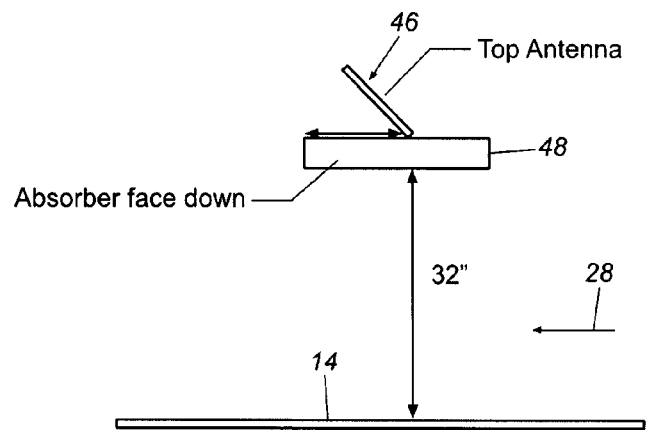

Referring to FIG. 11C top antenna 46 is disposed so that its upstream edge is aligned with reference line 71. Absorber pads 48 extend upstream and downstream from antenna 46, the downstream edge of absorber pads 48 being at a distance 77 (approximately 13.5 inches) from reference line 71. Thus, the downstream edge of absorber pads 48 extend downstream from line 49 (FIG. 11A). Referring also to FIG. 11D, absorber pads 48 are disposed approximately 32 inches above the surface of conveyor belt 14.

Figure 3:
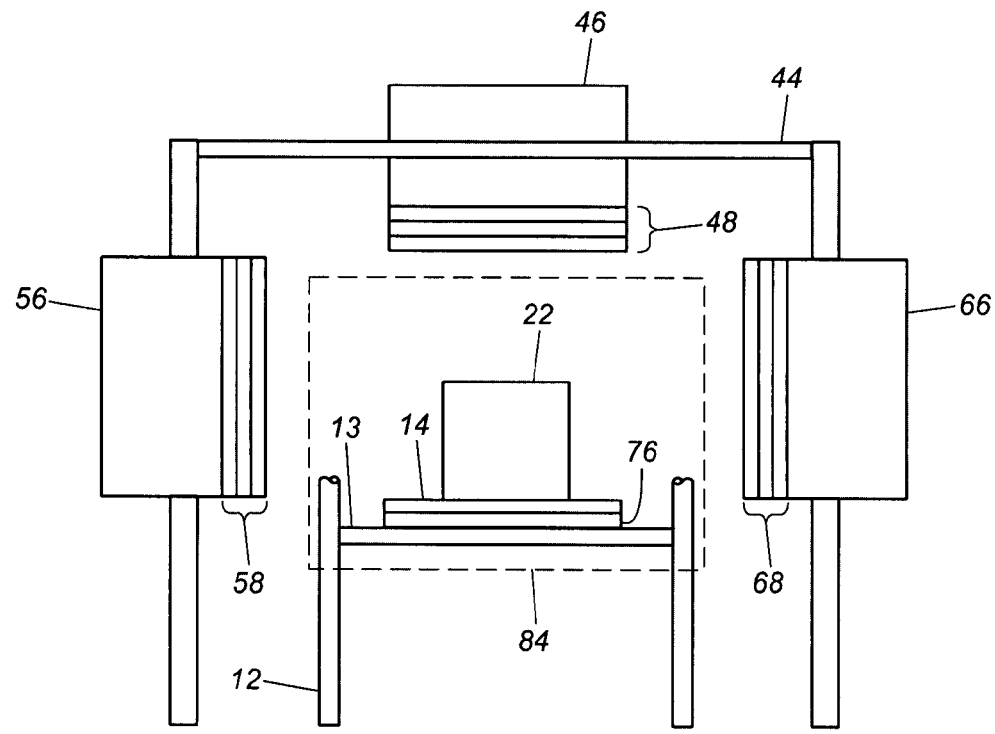
FIG. 3 is a front schematic view of the conveyor system shown in FIG. 1.

Referring to FIGS. 1 and 3, a start window 84 (FIG. 3) is defined by a plane intersecting conveyor belt 14 at transverse line 49 (FIG. 1) and marks the beginning of the most efficient antenna reading zone. A transmit point 86 is defined by a second vertical plane transverse to and intersecting conveyor belt 14. The transmit point marks the location at which HSC 30 saves information associated with a given package and removes the information from a package queue. In the presently described embodiment, transmit point 86 is located downstream from start window 84 at a distance of or greater than twice the maximum package length (in the belt's longitudinal direction) of a package expected to be carried by the conveyor, plus the maximum spacing between packages. For instance, if conveyor system 10 is to convey packages up to 36 inches in length at a between-package spacing of up to 15 inches, the minimum distance (along the path of travel of belt 14) between start window 84 and transmit point 86 is 87 inches.

Figure 2:
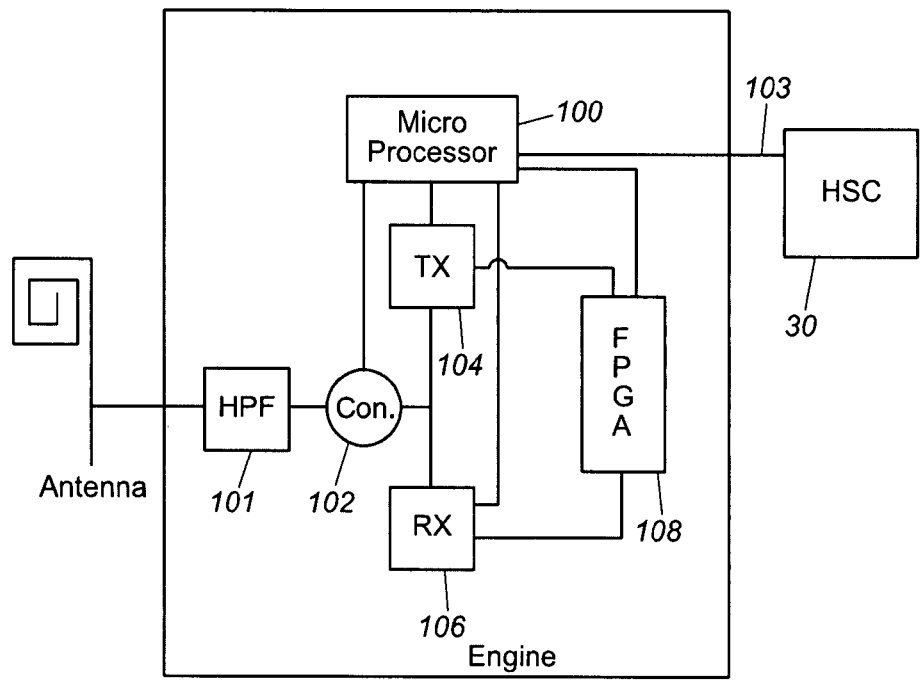
FIG. 2 is a schematic illustration of an RF engine for use in a system as in FIG. 1.

Antenna engines 52, 62, 72, and 80 are substantially identical. Each is comprised of the schematically illustrated components of FIG. 2, including a microprocessor 100, connector 102, transmitter 104, receiver 106, and FPGA 108. Additionally, antenna engine 80 includes a high pass filter 101, which is described below. Connector 102 connects transmitter 104 and receiver 106 to the antenna's feed line. Transmitter 104 and receiver 106 connect in turn to FPGA 108. Microprocessor 100 controls connector 102, transmitter 104, receiver 106 and FPGA 108 and communicates with HSC 30 via a connection line 103. HSC 30 initiates a transmission from the antenna by a command to microprocessor 100. In response, microprocessor 100 sends a bit sequence to transmitter 104, which then transmits the signal at a specified frequency and power level to the antenna via connector 102 and the antenna's feed line. The antenna returns a detected signal from an RFID tag to receiver 106 via the antenna's feed line and connector 102. Receiver 106 removes the carrier signal and sends the resulting information signal to FPGA 108. FPGA 108 extracts digital data from the receiver's signal and outputs a resulting digital signal to microprocessor 100, which then transmits the digital data to HSC 30. RFID engines suitable for use in the presently disclosed system are available from AWID Wireless Informations, Inc. of Monsey, N.Y.; Symbol Technologies, Inc. of San Jose, Calif. (e.g. the Matrics AR400); and ThingMagic of Cambridge, Mass. (e.g. the MERCURY 4).

As shown, high pass filter 101 is inserted between bottom antenna 76 and the components comprising the RFID tag reader. ESD events in the vicinity of bottom antenna 76 can cause high frequency signals to be sent from the antenna to the reader, which can damage the reader. Although the previously described static conductive and static dissipative strips reduce the potential for damage from ESD events, high pass filter 101 further reduces any high frequency energy caused by ESD events to an acceptable level for the RFID reader. In short, high pass filter 101 rejects ESD energy that is below the desired RFID band. Low loss, high pass filters suitable for use in the present disclosed invention are available from Mini-Circuits of Brooklyn, N.Y. (i.e., Part No. VHF-740). Band pass filters are also suitable for use in the disclosed system.

Referring to FIG. 1, conveyor system 10 may also include a scout reader 88 disposed between photodetector 36 and antenna frame 44. In one preferred embodiment, scout reader 88 is identical in construction and arrangement to the antenna tunnel defined by antennas 46, 56, 66 and 76 and includes an antenna frame, top antenna, opposing side antennas, bottom antenna and respective RFID engines as discussed above. For ease of explanation, the separate feed lines from the engines of scout reader 88 (corresponding to feed lines 50, 60, 70, and 78) are indicated as a single connection line 90. Similarly, the antenna engines of scout reader 88 (corresponding to antenna engines 52, 62, 72, and 80) are indicated collectively as antenna engine 92, and the output lines (corresponding to output lines 54, 64, 74, and 82) are indicated collectively at output line 94. Output lines 94 connect the scout reader antenna engines 92 with HSC 30.

A barcode scanner 96 is disposed above belt 14 at a point between photodetector 36 and transmit point 86. Barcode scanner 96 reads barcode labels on packages 22 and 24 and outputs corresponding information to HSC 30 via a connection line 98. Barcode scanner 96 can comprise any suitable bar code scanning system capable of reading barcode labels on packages traveling at a speed defined by conveyor system 10 and outputting corresponding information to a computer such as HSC 30, for example as available from Accu-Sort Systems, Inc. of Telford, Pa.

The scout reader's engines do not read the information on RFID tags disposed on the packages, but instead only determine the class of the RFID tags, which can be more rapidly accomplished. As should be understood in this art, determining the class of the RFID tags does not require the scout reader's engines to fully decode the tags, but rather to simply analyze the received signal for RFID class.

While one or more preferred embodiments of the invention have been described, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention.

What is claimed is:

1. A conveyor system for processing items on which radio frequency identification tags are disposed, the system comprising:

a frame, a conveyor that is disposed movably on the frame and that conveys items through a path of travel, each item having at least one respective radio frequency identification tag disposed thereon, an antenna disposed on the frame so that the conveyor is movable along the path of travel relative to the antenna, the antenna having a front edge and a rear edge that are transverse to the path of travel so that the antenna radiates radio frequency signals into a first area through which the items pass, wherein the antenna comprises, a ground plane, a substrate having a bottom surface received adjacent the ground plane, at least one patch element disposed on a top surface of the substrate, a cover received adjacent the top surface of the substrate, and a front static conductive strip disposed along a front edge of the cover such that the front static conductive strip is transverse to the path of travel of the conveyor, wherein the front static conductive strip is electrically connected to the ground plane such that an electrostatic discharge event adjacent the front static conductive strip is discharged to the ground plane.

2. The conveyor system as in claim 1, further comprising a groove formed along the front edge of the cover, wherein the front static conductive strip is received in the groove.

3. The conveyor system as in claim 1, further comprising a rear static conductive strip disposed along a rear edge of the cover, wherein the rear static conductive strip is electrically connected to the ground plane such that an electrostatic discharge event adjacent the rear static conductive strip is discharged to the ground plane.

4. The conveyor system as in claim 1, wherein the front static conductive strip further comprises an ultra high molecular weight polyethylene.

5. The conveyor system as in claim 1, wherein a top surface of the front static conductive strip is generally coplanar with a top surface of the cover.

6. The conveyor system as in claim 1, further comprising at least one static dissipative strip disposed on a top surface of the cover, wherein the static dissipative strip is electrically connected to the ground plane.

7. The conveyor system as in claim 6, wherein the static dissipative strip further comprises an ultra high molecular weight polyethylene.

8. The conveyor system as in claim 6, further comprising a groove formed in the top surface of the cover, wherein the static dissipative strip is received in the groove.

9. The conveyor system as in claim 8, wherein the static dissipative strip is disposed above the patch element and is electrically connected to the ground plane by a metal fastener, the metal fastener passing through a hole formed in a center of the patch element and the substrate.

10. The conveyor system as in claim 8, wherein the static dissipative strip has a first end adjacent the front static conductive strip and the static dissipative strip is parallel to the path of travel.

11. The conveyor system as in claim 1, wherein the substrate further comprises a dielectric material and the cover further comprises an ultra high molecular weight polyethylene.

12. The conveyor system as in claim 1, wherein the ground plane further comprises one of a stainless steel plate and a copper layer.

13. A conveyor system for processing items on which radio frequency identification tags are disposed, the system comprising:
 a frame having a generally planar top surface,
 a generally planar belt that is disposed movably on the frame above the generally planar top surface of the frame and that conveys items through a path of travel, each item having at least one respective radio frequency identification tag disposed thereon,
 at least one antenna disposed on the frame so that the belt is movable along the path of travel relative to the antenna and so that the at least one antenna is generally coplanar with the generally planar top surface beneath the belt, the at least one antenna having a front edge and a rear edge that are transverse to the path of travel and oriented with respect to the belt so that the at least one antenna radiates radio frequency signals into a first area that is proximate the belt and through which the items pass, the at least one antenna comprising,
 a substrate,
 at least one patch element disposed on a top surface of the substrate,
 a cover received adjacent the top surface of the substrate, and
 a first static dissipative strip disposed along a top surface of the cover,
 wherein the static dissipative strip is connected to an electrical ground such that electrostatic charges are dissipated to the electrical ground.

14. The conveyor system as in claim 13, further comprising a groove formed in the top surface of the cover, wherein the first static dissipative strip is received in the groove.

15. The conveyor system as in claim 13, wherein a front end of the first static dissipative strip is disposed rearward of an outer periphery of the at least one patch element and a rear end of the first static dissipative strip extends rearwardly toward the rear edge of the antenna.

16. The conveyor system as in claim 13, wherein the first static dissipative strip is disposed above the patch element such that the static dissipative strip is within an outer periphery of the patch element.

17. The conveyor system as in claim 13, further comprising a static conductive strip disposed along the front edge of the antenna, wherein the first static conductive strip is connected to the electrical ground such that an electrostatic discharge event adjacent the static conductive strip is discharged to the electrical ground.

18. The conveyor system as in claim 13, wherein the first static dissipative strip and the static conductive strip further comprise ultra high molecular weight polyethylenes.

19. The conveyor system as in claim 13, further comprising a ground plane adjacent a bottom surface of the substrate, wherein the ground plane is connected to the electrical ground.

20. An antenna for use in a conveyor system in which items on which radio frequency identification tags are disposed are moved on a conveyor along a path of travel, the antenna comprising:
 a ground plane,
 a substrate having a bottom surface received adjacent the ground plane,
 at least one patch element disposed on a top surface of the substrate,
 a cover received adjacent the top surface of the substrate, and
 a front static conductive strip disposed along a front edge of the cover such that the front static conductive strip is transverse to the path of travel of the conveyor,
 wherein the antenna is disposed beneath the conveyor so that the conveyor is movable along the path of travel relative to the antenna and a front edge of the antenna is transverse to the path of travel,
 wherein the front static conductive strip is electrically connected to the ground plane such that an electrostatic discharge event adjacent the front static conductive strip is discharged to the ground plane.

21. The conveyor system as in claim 20, further comprising at least one static dissipative strip disposed on the top surface of the cover, wherein the static dissipative strip is electrically connected to the ground plane.

22. The conveyor system as in claim 21, wherein a front end of the static dissipative strip is disposed toward the front edge of the antenna and a rear end of the static dissipative strip extends toward the rear edge of the antenna.

23. The conveyor system as in claim 22, wherein the front static conductive strip further comprises a first ultra-high molecular weight polyethylene and the static dissipative strip further comprises a second ultra-high molecular weight polyethylene.

24. The conveyor system as in claim 23, further comprising a groove formed on the top surface of the cover, wherein the static dissipative strip is received in the groove, and wherein a top surface of the front static conductive strip is generally coplanar with the top surface of the cover.

25. A conveyor system for processing items on which radio frequency identification tags are disposed, the system comprising:
 a frame,
 a conveyor that is disposed movably on the frame and that conveys items through a path of travel from a first position to a second position, each item having at least one respective radio frequency identification tag disposed thereon,
 an antenna disposed on the frame between the first position and the second position so that the conveyor is movable along the path of travel relative to the antenna, the antenna having a front edge and a rear edge that are transverse to the path of travel so that the antenna radiates radio frequency signals into a first area through which the items pass, wherein the antenna comprises,
 a ground plane,
 a substrate having a bottom surface received adjacent the ground plane,
 at least one patch element disposed on a top surface of the substrate,
 a cover received adjacent the top surface of the substrate, and
 an electrically conductive strip disposed on a top surface of the cover between the first position and the front edge of the antenna,
 wherein the electrically conductive strip is electrically connected to the ground plane such that an electrostatic discharge event adjacent the electrically conductive strip is discharged to the ground plane.

26. The conveyor system as in claim 25, further comprising at least one static dissipative strip disposed on a top surface of the cover, wherein the static dissipative strip is electrically connected to the ground plane.

27. The conveyor system as in claim 26, wherein the static dissipative strip further comprises an ultra high molecular weight polyethylene.

28. The conveyor system as in claim 25, wherein the electrically conductive strip further comprises an ultra high molecular weight polyethylene.

29. The conveyor system as in claim 25, wherein the electrically conductive strip further comprises a static conductive material.

* * * * *